US006969856B1

(12) United States Patent
Hillenbrand et al.

(10) Patent No.: US 6,969,856 B1
(45) Date of Patent: Nov. 29, 2005

(54) TWO BAND IMAGING SYSTEM

(75) Inventors: Eric Hillenbrand, Evansville, IN (US); Mark Dombrowski, Escondido, CA (US); Jim Lorenz, Escondido, CA (US); Ming-De Li, San Diego, CA (US); Eric Ford, LaCanada, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 315 days.

(21) Appl. No.: 10/601,893

(22) Filed: Jun. 19, 2003

(51) Int. Cl.[7] ............................................. H01L 25/00
(52) U.S. Cl. ................. 250/332; 250/330; 250/339.01
(58) Field of Search .............................. 250/332, 330, 250/339.01

(56) References Cited

U.S. PATENT DOCUMENTS

| | | | |
|---|---|---|---|
| 5,420,421 A | | 5/1995 | Lingren et al. |
| 5,424,543 A | | 6/1995 | Dombrowski et al. |
| 5,555,324 A | * | 9/1996 | Waxman et al. ............ 382/254 |
| 5,557,261 A | * | 9/1996 | Barbour ...................... 340/580 |
| 5,581,271 A | * | 12/1996 | Kraemer ........................ 345/8 |
| 5,602,394 A | | 2/1997 | Dombroski et al. |
| 5,821,535 A | | 10/1998 | Dombroski et al. |
| 5,949,074 A | | 9/1999 | Dombroski et al. |
| 6,315,412 B1 | * | 11/2001 | Snodderly et al. .......... 351/200 |
| 6,717,668 B2 | * | 4/2004 | Treado et al. ............... 356/327 |
| 6,781,127 B1 | * | 8/2004 | Wolff et al. .................. 250/332 |
| 6,898,458 B2 | * | 5/2005 | Zeng et al. .................. 600/476 |
| 2003/0053181 A1 | * | 3/2003 | Nizani ......................... 359/189 |

OTHER PUBLICATIONS

Meng Lieh Sheu, Mon Chau Shie, Tai Ping Sun, Far Wen Jih "A Cross-Check Test Scheme for Infrared Focal Plane Array" Ap-Asic IEEE, SSCS/EDS Proceedings, Aug. 7, 2002.
Donald Pritchett, Roy Hendrick, Douglas Moore, David Briscoe, Joseph Bishop, Robert Medrano, Mike Vigil "AEOS Radiometer System: A Multi Channel Imaging Radiometer" 1999 AMOS Tech. Conf.
O.Nesher, S.Elkind, A.Adin, U.Palty, O.Pelleg, E.Jacobson, T.Markovitz, I. Szafranek,Z.Calahorra,J.Oikine Schlessinger "Performance of BF Focal Plane Array 320x256 InSb Detectors", unknown pub date.

* cited by examiner

Primary Examiner—Otilia Gabor
Assistant Examiner—Christine Sung
(74) Attorney, Agent, or Firm—Mark O. Glut

(57) ABSTRACT

A two band imaging system having two focal plane array detectors, a beam splitter, and an enclosure. The beam splitter disposed within the system at an angle to the optical axis such that light entering the system is split and is simultaneously directed to each of the two focal plane array detectors. The two focal plane array detectors and beam splitter are disposed within the enclosure.

9 Claims, 1 Drawing Sheet

US 6,969,856 B1

TWO BAND IMAGING SYSTEM

STATEMENT OF GOVERNMENT INTEREST

Figure 1:
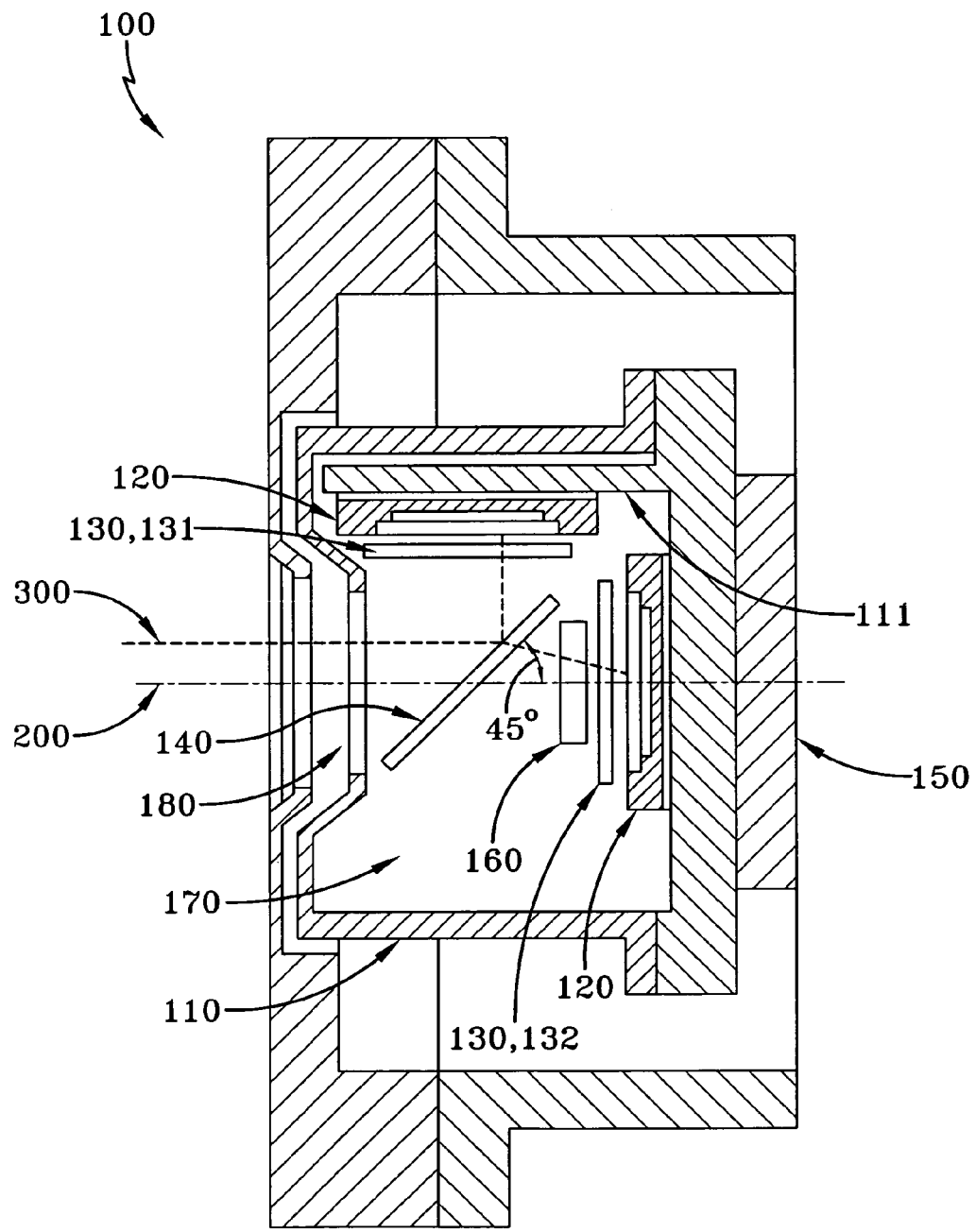

The invention described herein may be manufactured and used by or for the Government of the United States of America for governmental purposes without payment of any royalties thereon or therefor.

BACKGROUND

The present invention relates to a two band imaging system. More specifically, but without limitation, the present invention relates to a two band real time infrared imaging absolute radiometer.

Infrared imaging devices convert invisible infrared energy into useful forms such as visible images. This is accomplished by first detecting infrared radiation, which is emitted or reflected from objects in a field of view, and then producing resultant data corresponding to the flux level of the infrared radiation that is detected. Generally, infrared imaging devices include an optical system for receiving the infrared radiation, detector elements for producing a response corresponding to the flux level of the infrared radiation received through the optical system, and an electronics unit for processing the response produced by the detector elements and generating a corresponding digital output.

In general, commercially available infrared imaging systems which are designed to provide video imagery, have limited dynamic range, operate in a single band, and if configured to operate as thermographs, are calibrated in temperature, not absolute radiance.

Infrared imaging systems have long been used to evaluate scene radiance. Scene radiance can be defined, but without limitation, as the radiant brightness or light of a particular area. In many cases, users are not fully conversant with the instrumentation and confine themselves to attempting thermography (the determination of the temperature of the target). Current thermographic imagers rely on radiance measurements to evaluate temperatures. However, these imagers require prior knowledge of the emissivity of the measured object for the measurement to have any physical validity.

Thus, there is a need in the art to provide a two band imaging system that incorporates the listed benefits without the limitations inherent in present methods. For the foregoing reasons, there is a need for a two band imaging system.

SUMMARY

The instant invention is directed to a two band imaging system that satisfies the needs enumerated above and below.

The present invention is directed to a two band imaging system having two focal plane array detectors, a beam splitter, and an enclosure. The beam splitter is disposed within the system at an angle to the optical axis such that light entering the system is split and is simultaneously directed to each of the two focal plane array detectors. The two focal plane array detectors and the beam splitter are disposed within the enclosure.

It is an object of the invention to provide an imaging system that provides multiple focal plane array detectors disposed within one enclosure.

It is an object of the invention to provide an imaging system that incorporates separate focal plane arrays for easier manufacture, maintenance and upgrades.

It is an object of the invention to provide an imaging system that provides imagery in two widely separated spectral bands.

It is an object of the invention to provide an imaging system that can be operated with band separations greater than about 1.0 micrometer.

It is an object of the invention to provide an imaging system that is compact and highly resistant to vibration.

It is an object of the invention to provide an imaging system that does not require prior knowledge of the emissivity of the measured object to accurately determine temperature.

It is an object of the invention to provide an imaging system that provides real time absolute radiance images.

DRAWINGS

These and other features, aspects and advantages of the present invention will become better understood with reference to the following description and appended claims, and accompanying drawing wherein:

FIG. 1 is a side view of an embodiment of the imaging system.

DESCRIPTION

The preferred embodiment of the present invention is illustrated by way of example below and in FIG. 1. As seen in FIG. 1, the two band imaging system 100 includes two focal plane array detectors 120, a beam splitter 140, and an enclosure 170. The preferred enclosure is a Dewar vessel 170. The beam splitter 140 is disposed within the imaging system 100 at an angle to the optical axis 200 such that light 300 entering the system 100 is split and is simultaneously directed to each of the two focal plane array detectors 120. An optical axis 200 is defined, but without limitation, as the straight line that is coincident with the axis of symmetry of the surfaces (the optical axis of a system is often coincident with its mechanical axis, but it need not be.) The two focal plane array detectors 120 and the beam splitter 140 are entirely disposed within the enclosure or Dewar vessel 170.

The preferred embodiment of the invention may also include two filters of known band-pass 130, a mounting assembly 110, and an image processor 150. As seen in FIG. 1, in the preferred embodiment, the two focal plane array detectors 120 may be mounted on the mounting assembly 110, and each filter of known band-pass 130 is placed in front of a corresponding focal plane array detector 120. The image processor 150 converts light entering the two focal plane array detectors 120 into a real-time absolute radiance image.

As shown in FIG. 1, the mounting assembly 110 may have an inner section 111 that is substantially rectangular or square. The two focal plane array detectors 120 may be mounted on adjacent sides such that they may be substantially perpendicular to each other. The preferred mounting assembly 110 is a single monolithic mounting assembly.

The preferred focal plane array detector 120 is an infrared focal plane array detector. An infrared focal plane array detector 120 is defined, but without limitation, as a pixilated two-dimensional matrix of detector elements sensitive to light. The two infrared focal plane array detectors 120 may be, but without limitation, of the indium antimonide type, cadmium telluride type, or any other suitable type of focal plane array detector.

A filter of known band-pass 130 may be defined, but without limitation, as a transducer for separating waves on the basis of their frequency, which has a single transmission band, neither of the cutoff frequencies being zero or infinite. One filter of known band-pass 130 may be a short wave infrared (SWIR)(about 1.5 to about 3.0 μm) filter 131, while the other filter may be a midwave infrared (MWIR)(about 3.0 to about 5.0 μm) filter 132. The filter range may also be extended to the long wave infrared (LWIR) (about 8 to about 14 μm) range or into the UV-Visible-Near IR range (<about 1.5 μm).

The preferred type of beam splitter 140 is a dichroic beam splitter; however, any type of beam splitter 140 or similarly functioning apparatus may be utilized in the invention. A dichroic beam splitter 140 is defined, but without limitation, as an optical element having or showing two colors, which reflects part of a beam of light and transmits part of the beam of light. In the preferred embodiment, the dichroic beam splitter 140 is disposed within the imaging system 100 at about a 45 (forty-five) degree angle to the optical axis 200 such that light entering the system 100 and the dichroic beam splitter 140 is split and is simultaneously directed to each of the two infrared focal plane array detectors 120. Optical distortion on the transmissive path through the dichroic beam splitter 140 can be corrected using an optic plate 160. The optic plate 160 may be a cylindrical optic plate or a flat tilt plate. The optic plate 160 may be disposed within the Dewar vessel 170.

As stated earlier, the preferred enclosure is a Dewar vessel 170. A Dewar vessel 170 may be defined, but without limitation, as a container with an evacuated space between two highly reflected walls used to keep substances at near-constant temperature. The Dewar vessel 170 may be manufactured from glass with a coating of mirror silver, any type of metal or metal alloy, or any type of suitable material. However, for applications not requiring cooling of the focal plane arrays, the enclosure need not be evacuated, but instead can be any suitable enclosure around the focal planes.

The two band imaging system 100 may include an imaging optic 180. The Dewar vessel 170 may be positioned behind the imaging optic 180.

In the preferred embodiment, the image processor 150 for providing real time absolute radiance imagery utilizes a method and/or algorithm that relies on camera characteristics alone to make the measurement of absolute radiance. In this algorithm it is assumed that the signal coming out of the camera (S) is in some way proportional to input radiance (L). The algorithm defines a radiometric gain factor (R) so that $$S*R=L \quad \text{(Equation 1)}$$

Assume L(0)=L(n)=S(n)*R, where L(n) is the noise equivalent radiance and S(n) is the noise signal. So, $$S(m)=S(\text{Total})-(S(FPA)+S(n)) \quad \text{(Equation 2)}$$

$$L(m)=L(\text{World})-L(n) \quad \text{(Equation 3)}$$

L(0) is the radiance zero, S(m) is the valid measurement signal, S(Total) is the total signal, S(FPA) is the focal plane array (electronics) signal, L(m) is the measurable radiance and L(World) is the world radiance. Substituting equation 2 and equation 3 into equation 1 yields, $$(S(\text{Total})-(S(FPA)+S(n)))*R=L(\text{World})-L(n) \quad \text{(Equation 4)}$$

Rearranging equation 4 yields $$(S(\text{Total})-(S(FPA)+S(n)))*R+L(n)=L(\text{World}) \quad \text{(Equation 5)}$$

Assume that L(World)=L(Scene)+L(Optics). Substituting into equation 5 yields $$(S(\text{Total})-(S(FPA)+S(n)))*R+L(n)=L(\text{Scene})+L(\text{Optics}) \quad \text{(Equation 6)}$$

Rearranging equation 6 yields $$(S(\text{Total})-(S(FPA)+S(n)))*R+L(n)-L(\text{Optics})=L(\text{Scene}) \quad \text{(Equation 7)}$$

or $$(S(\text{Total})-(S(FPA)+S(n)))*R+L(n)-L(\text{Scene})=L(\text{Optics}) \quad \text{(Equation 8)}$$

In the preferred embodiment equations 7 and 8 are used to reduce the data from an imager and create real time absolute radiance image.

In operation, in the preferred embodiment, light 300 enters the imaging system 100, and passes through the imaging optic 180 and to the dichroic beam splitter 140. The dichroic beam splitter 140 then splits the light 300 and simultaneously directs the light 300 in the direction of each of the two infrared focal plane array detectors 120. Prior to entering the individual infrared focal plane array detector(s) 120, the light may pass through the optic plate 160, then the light passes through a filter of known band-pass 130 and then to the infrared focal plane array detector(s) 120, which then passes the light to an image processor 150. The signal arising from the irradiance at both infrared focal plane array detectors 120 is then digitized using an Analog/Digital Converter, which may be embedded in the image processor 150. The digital signal is passed to the digital image processor, which may include a set of Field Programmable Gate Arrays (FPGAs) or other digital processing integrated circuits (IC) where the data is processed and an image is produced.

Once the digital image processor has the digital signal the focal plane array offset is subtracted, the data is normalized to correct for nonuniformity of the detectors, the focal plane array/electronics noise signal is subtracted, the focal array signal is converted to radiance values, the zeroth level radiance is subtracted, the fore optics radiance is subtracted, channels are correlated and then images (first band, second band, correlated) are displayed. The fore optics radiance is calculated in real time using Planck's Law, the measured lens temperature and the empirically measured effective emissivity of the fore optic assembly. The focal plane array offset is measured using a cold shutter positioned between the focal plane assembly and the fore optic.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A two band imaging system, the two band system having an optical axis, the two band imaging system comprising:
   a. a mounting assembly;
   b. two infrared focal plane array detectors, the two infrared focal plane array detectors mounted on the mounting assembly, the two infrared focal plane array detectors are substantially perpendicular to each other;

c. two filters of known band-pass, each filter placed in front of a corresponding infrared focal plane array detector, one of the two filters of known band-pass is a short wave infrared filter, while the other filter of known band-pass is a midwave infrared filter;

d. a dichroic beam splitter, the dichroic beam splitter disposed within the system at an angle to the optical axis such that light entering the system is split and is simultaneously directed to each of the two infrared focal plane array detectors;

e. a Dewar vessel, the two infrared focal plane array detectors, the two filters of known band-pass and the dichroic beam splitter disposed within the Dewar vessel;

f. an image processor for providing real time absolute radiance imagery, the image processor simultaneously converting the light entering the two infrared focal plane array detectors into an absolute radiance image; and, g. an optic plate for correcting optical distortion of light disposed within the system, the optic plate is disposed between the midwave infrared filter and the dichroic beam splitter.

2. A two band imaging system, the two band imaging system having an optical axis, the two band imaging system comprising:

a. a mounting assembly, the mounting assembly being a single monolithic mounting assembly;

b. two infrared focal plane array detectors, the two infrared focal plane array detectors mounted on the mounting assembly wherein the two infrared focal plane array detectors are substantially perpendicular to each other;

c. two filters of known band-pass, each filter placed in front of a corresponding infrared focal plane array detector, one of the two filters of known band-pass is a short wave infrared filter, while the other filter of known band-pass is a midwave infrared filter;

d. a dichroic beam splitter, the dichroic beam splitter disposed within the system at an angle to the optical axis such that light entering the system is split and is simultaneously directed to each of the two infrared focal plane array detectors;

e. an optic plate for correcting optical distortion, the optic plate disposed between the midwave infrared filter and the dichroic beam splitter;

f. a Dewar vessel, the two infrared focal plane array detectors, the two filters of known band-pass, the dichroic beam splitter, and the optic plate disposed within the Dewar vessel; and g. an image processor for providing real-time absolute radiance imagery, the image processor simultaneously converting the light entering the two infrared focal plane array detectors into an absolute radiance image.

3. The two band imaging system of claim 2, wherein the dichroic beam splitter disposed within the system at about a 45 degree angle to the optical axis.

4. The two band imaging system of claim 3, wherein the two infrared focal plane array detectors are selected from the group consisting of indium antimonide type detectors and cadmium telluride type detectors.

5. The two band imaging system of claim 4, wherein the image processor utilizes an algorithm that relies on imaging system characteristics alone.

6. The two band imaging system of claim 5, wherein the image processor utilizes the following equations to create real time absolute radiance imagery:

$$S(\text{Total}) - (S(FPA) + S(n)))^* R + L(n) - L(\text{Optics}) = L(\text{Scene}); \text{ and} \tag{a}$$

$$(S(\text{Total}) - (S(FPA) + S(n)))^* R + L(n) - L(\text{Scene}) = L(\text{Optics}). \tag{b}$$

7. The two band imaging system of claim 6, wherein the imaging system further comprising an imaging optic for passing light into the imaging system, the Dewar vessel disposed behind the imaging optic.

8. The two band imaging system of claim 7, wherein the optic plate is a cylindrical optic plate.

9. The two band imaging system of claim 7, wherein the optic plate is a flat tilt plate.

* * * * *